US012589795B2

(12) United States Patent
Shin

(10) Patent No.: US 12,589,795 B2
(45) Date of Patent: Mar. 31, 2026

(54) STEERING-ASSISTING DEVICE

(71) Applicant: HL MANDO CORPORATION,
Gyeonggi-do (KR)

(72) Inventor: Jun Ho Shin, Gyeonggi-do (KR)

(73) Assignee: HL MANDO CORPORATION,
Gyeonggi-do (KR)

( * ) Notice: Subject to any disclaimer, the term of this patent is extended or adjusted under 35 U.S.C. 154(b) by 592 days.

(21) Appl. No.: 17/916,568

(22) PCT Filed: Apr. 13, 2021

(86) PCT No.: PCT/KR2021/004649
§ 371 (c)(1),
(2) Date: Sep. 30, 2022

(87) PCT Pub. No.: WO2021/210892
PCT Pub. Date: Oct. 21, 2021

(65) Prior Publication Data
US 2023/0142843 A1 May 11, 2023

(30) Foreign Application Priority Data
Apr. 14, 2020 (KR) ........................ 10-2020-0045489

(51) Int. Cl.
*B62D 5/04* (2006.01)
*B62D 3/12* (2006.01)
(Continued)

(52) U.S. Cl.
CPC ............. *B62D 5/0472* (2013.01); *B62D 3/12* (2013.01); *B62D 5/0424* (2013.01);
(Continued)

(58) Field of Classification Search
CPC ...... B62D 5/0472; B62D 3/12; B62D 5/0484; B62D 5/0487; B62D 5/0424;
(Continued)

(56) References Cited

U.S. PATENT DOCUMENTS

| | | | | |
|---|---|---|---|---|
| 6,246,142 B1 * | 6/2001 | Asao | .................... | H02K 15/021 |
| | | | | 310/216.136 |
| 7,157,875 B2 * | 1/2007 | Kamen | ................ | B62K 11/007 |
| | | | | 318/434 |

(Continued)

FOREIGN PATENT DOCUMENTS

| | | |
|---|---|---|
| DE | 103 04 189 | 9/2003 |
| JP | 2005-022634 | 1/2005 |

(Continued)

OTHER PUBLICATIONS

International Search Report for PCT/KR2021/004649 mailed on Jul. 12, 2021 and its English Machine Translation by the WIPO (now published as WO 2021/210892).

(Continued)

*Primary Examiner* — Timothy Wilhelm
(74) *Attorney, Agent, or Firm* — WOMBLE BOND DICKINSON (US) LLP

(57) ABSTRACT

The present disclosure relates to a steering-assisting device. Specifically, a steering-assisting device according to the present disclosure comprises: a stator having a plurality of coils wound thereon; a rotor which is rotated by the stator; and a connection part for transferring rotation force generated in accordance with rotation of the rotor to a rack bar, wherein the connection part is connected to the rack bar in a manner for minimizing vibration generated according to a winding pattern of the stator when at least one of the coils of the stator malfunctions.

7 Claims, 12 Drawing Sheets

(51) Int. Cl.
   *F16H 7/02*     (2006.01)
   *H02K 1/16*     (2006.01)
   *H02K 5/24*     (2006.01)
   *H02K 7/10*     (2006.01)

(52) U.S. Cl.
   CPC ......... *B62D 5/0484* (2013.01); *B62D 5/0487*
      (2013.01); *F16H 7/02* (2013.01); *H02K 1/16*
      (2013.01); *H02K 5/24* (2013.01); *H02K 7/10*
      (2013.01); *H02K 7/1008* (2013.01)

(58) Field of Classification Search
   CPC .......... B62D 5/0448; H02K 1/16; H02K 7/10;
      H02K 1/146; H02K 7/1008; H02K 5/24;
      H02K 5/26; F16H 7/02
   See application file for complete search history.

(56)                  References Cited

U.S. PATENT DOCUMENTS

| | | | | |
|---|---|---|---|---|
| 7,806,225 | B2 * | 10/2010 | Itoh | H02K 3/28 |
| | | | | 310/179 |
| 8,847,522 | B2 * | 9/2014 | Nashiki | H02P 25/092 |
| | | | | 318/701 |
| 9,172,324 | B2 * | 10/2015 | Kinashi | H02P 25/22 |
| 10,404,124 | B2 * | 9/2019 | Ikeda | H02K 1/274 |
| 10,418,866 | B2 * | 9/2019 | Hirotani | H02K 3/28 |
| 10,574,125 | B2 * | 2/2020 | Hirotani | H02K 1/246 |
| 10,615,656 | B2 * | 4/2020 | Haga | H02K 3/28 |
| 10,673,289 | B2 * | 6/2020 | Nakagawa | H02K 1/148 |
| 10,749,387 | B2 * | 8/2020 | Sakuma | H02K 1/278 |
| 10,833,549 | B2 * | 11/2020 | Okazaki | H02K 3/28 |
| 10,910,892 | B2 * | 2/2021 | Hirotani | H02K 3/48 |
| 11,001,297 | B2 * | 5/2021 | Takizawa | H02P 6/28 |
| 11,075,599 | B2 * | 7/2021 | Shiino | B62D 5/0463 |
| 11,239,717 | B2 * | 2/2022 | Islam | H02K 3/48 |
| 11,349,420 | B2 * | 5/2022 | Takahashi | H02K 3/12 |
| 11,509,180 | B2 * | 11/2022 | Koga | H02K 15/064 |
| 11,515,742 | B2 * | 11/2022 | Shelton | H02K 1/146 |
| 11,539,264 | B2 * | 12/2022 | Takeno | H02K 7/006 |
| 11,784,534 | B2 * | 10/2023 | Morishita | B62D 5/0403 |
| | | | | 310/89 |
| 11,863,018 | B2 * | 1/2024 | Nashiki | H02K 19/103 |
| 12,233,963 | B2 * | 2/2025 | Enomoto | F16C 35/077 |
| 2007/0158130 | A1 | 7/2007 | Saruwatari et al. | |
| 2007/0187169 | A1 | 8/2007 | Sasaki et al. | |
| 2011/0316379 | A1 | 12/2011 | Jin | |
| 2018/0026492 | A1 * | 1/2018 | Takizawa | H02K 5/00 |
| | | | | 310/68 R |
| 2018/0069462 | A1 * | 3/2018 | Maeda | H02K 3/28 |
| 2019/0036389 | A1 * | 1/2019 | Isogai | H02K 5/225 |
| 2020/0028397 | A1 * | 1/2020 | Sakuma | H02K 21/14 |
| 2020/0044497 | A1 * | 2/2020 | Momen | H02K 3/12 |

FOREIGN PATENT DOCUMENTS

| | | | |
|---|---|---|---|
| JP | 2005-237068 | | 9/2005 |
| JP | 2005237068 | A * | 9/2005 |
| JP | 2013-095395 | | 5/2013 |
| KR | 10-2012-0139972 | | 12/2012 |
| KR | 20120139972 | A * | 12/2012 |
| KR | 10-2016-0038321 | | 4/2016 |
| KR | 10-2017-0031342 | | 3/2017 |

OTHER PUBLICATIONS

Written Opinion of the International Searching Authority for PCT/
KR2021/004649 mailed on Jul. 12, 2021 and its English Machine
Translation by Google Translate (now published as WO 2021/
210892).
Office Action dated Sep. 9, 2025 for German Patent Application No.
11 2021 002 302.0 and its English translation by Google Translate.
Office Action (1st) dated Dec. 17, 2025 for Chinese Patent Appli-
cation No. 202180027796.8 and its English translation from Global
Dossier.

* cited by examiner

140

STEERING-ASSISTING DEVICE

CROSS-REFERENCE TO RELATED APPLICATIONS

This application is the U.S. National Stage of International Patent Application No. PCT/KR2021/004649 filed on Apr. 13, 2021, which claims priority to Korean Patent Application No. 10-2020-0045489 filed in the Korean Intellectual Property Office on Apr. 14, 2020, the disclosure of which is incorporated by reference herein in its entirety.

TECHNICAL FIELD

The present embodiments relate to a steering assist device.

BACKGROUND ART

In general, a vehicle adopts a power steering assist device as means to ensure steering stability by reducing the steering force of the steering wheel. Conventionally, hydraulic power steering (HPS) has been widely used as power steering assist devices but are recently being replaced with electric power steering (EPS) which facilitates steering using a motor, instead of a hydraulic pump, and is eco-friendly.

To achieve the above-described goals, the electronic steering system adopts an electronic controller unit (ECU), which means an electronic control device that controls the status of the vehicle's engine, automatic transmission, or ABS by a computer. Further, with the development of vehicle and computer performance, the ECU is also serving to control all parts of the vehicle including the driving system, the braking system, and the steering system, as well as to control the automatic transmission.

Recently, as the ECU plays an important role, requirements for the reliability of the ECU are increasing. Accordingly, rather than relying on a single ECU, a redundancy system is adopted which includes a redundant ECU that replaces the existing ECU when the ECU fails to normally work or stops working due to errors or physical shocks to the existing ECU.

As the redundancy system widens its scope, the steering motor, such as the one for moving the rack bar, also adopts a dual winding motor which has two or more coil windings around a single motor to allow for a normal operation when the coil, a key component of the motor, stops working or fails to work due to errors or physical shocks, like in the above-described ECU, as a part of the redundancy system.

As the dual winding motor is driven, vibration may occur. A need exists for a method for minimizing such vibration.

DETAILED DESCRIPTION OF THE INVENTION

Technical Problem

In the foregoing background, the disclosure provides a steering assist device which is connected with the rack bar to minimize the vibration caused according to the winding pattern when at least one coil fails.

Technical Solution

To achieve the foregoing objectives, in an aspect, the disclosure provides a steering assist device comprising a stator around which a plurality of coils are wound, a rotator rotated by the stator, and a connector transferring a rotational force, generated as the rotator rotates, to a rack bar, wherein the connector is connected to the rack bar in a direction of minimizing vibration generated depending on a winding pattern of the stator when at least one of the coils of the stator fails.

Advantageous Effects

According to the disclosure, the steering assist device changes the direction of connection with the rack bar depending on the winding pattern of the stator, reducing noise and vibration in the steering assist device when the coil of the stator fails.

MODE FOR CARRYING OUT THE INVENTION

Figure 1:
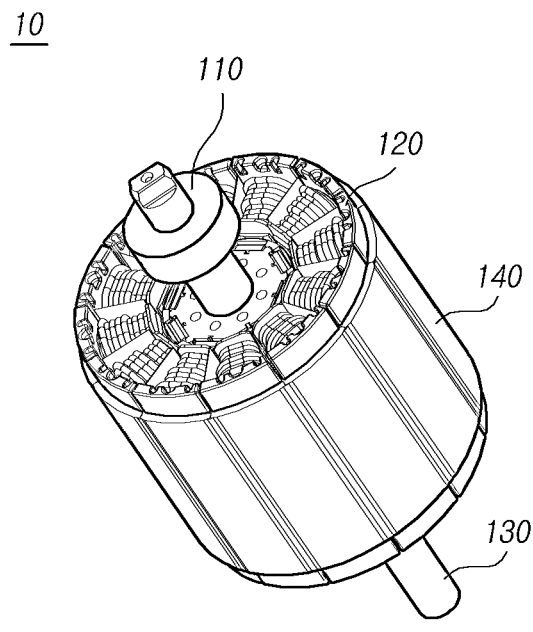
FIG. 1 is a view exemplarily illustrating an example of a steering assist device according to an embodiment of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

A steering assist device 10 according to an embodiment is described below with reference to FIG. 1.

FIG. 1 is a view exemplarily illustrating an example of a steering assist device 10 according to an embodiment of the disclosure.

Referring to FIG. 1, a steering assist device 10 according to an embodiment of the disclosure may include a rotator 110, a stator 120, a connector 130, and a housing 140.

The steering assist device may be a motor that includes the rotator 110 formed of a permanent magnet and the stator 120 surrounding the rotator 110 and having a coil winding and converts electric energy into mechanical energy as the rotator 110 is axially rotated by the magnetic field generated between the stator 120 and the rotator 110 according to application of current to the stator 120.

The steering assist device 10 transfers the rotational force to the rack bar 410 and is connected to the rack bar 410 in the direction along which the vibration generated thereby is minimized, reducing the vibration of the steering assist device 10.

The stator 120 may receive the rotator 110 in the center. The stator 120 may include a plurality of coil slots for receiving the coil. Specifically, the stator 120 may include a coil winding in a thin metal line through which current may flow to generate a magnetic field. The stator 120 may include the coil slots for receiving the coil.

The coil slots may be arranged while maintaining a predetermined distance from the rotator 110. An even number of coil slots may be formed. The plurality of coil slots may be arranged while being spaced apart from each other along the circumferential direction. Each coil slot may include two poles protruding from the stator 120 to the rotator 110 and which the conductive line is wound around. Each coil slot may implement three phases, which may be denoted by U, V, and W.

The rotator 110 may be rotated by the stator 120 and be formed of a permanent magnet. Further, if current is applied to the stator 120, the rotator 110 may be rotated clockwise or counterclockwise around the rotational axis depending on the magnetic field relationship between the rotator 110 and the stator 120.

The connector 130 may transfer the rotational force, generated as the rotator 110 rotates, to the rack bar 410. The connector 130 is connected to the center of the rotator 110 and may include a shaft that is formed in the direction of the rotational axis in the center of the rotator 110 to rotate alongside the rotator 110.

The housing 140 may receive the stator 120 and the rotator 110. The housing 140 may form the outer appearance of the steering assist device 10. The housing 140 may be formed in a cylindrical shape, but is not limited to a specific shape as long as its shape is capable of receiving the stator 120 and the rotator 110 and the rotator 110 is rotatable therein. The housing 140 may be formed of a metal to remain in shape even at a high temperature.

Figure 2:
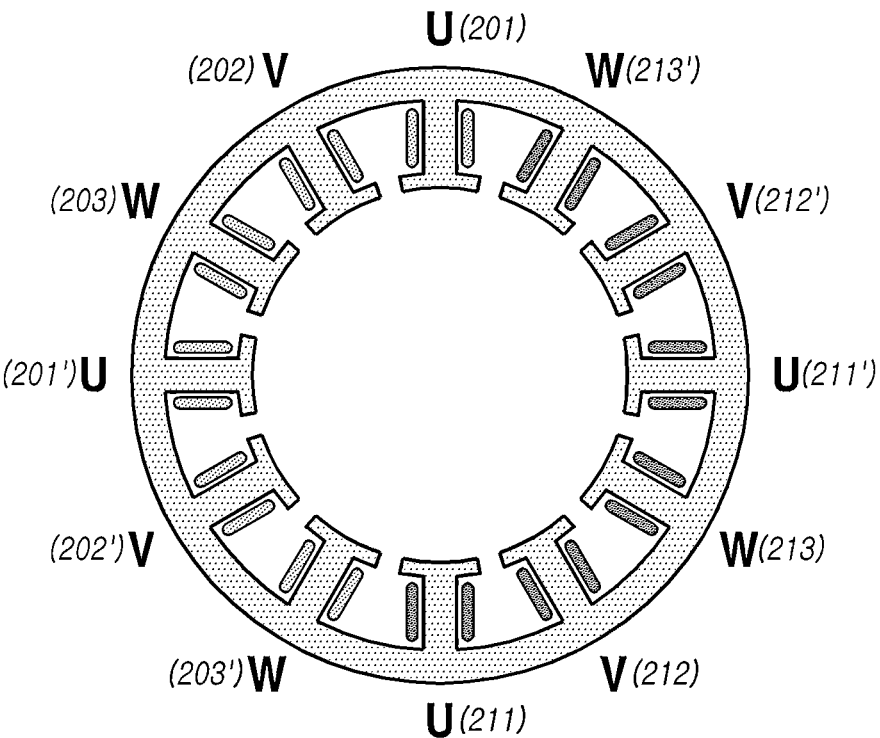
FIG. 2 is a view illustrating a winding pattern of a stator according to an embodiment.

FIG. 2 is a view illustrating a winding pattern of a stator 120 according to an embodiment.

Referring to FIG. 2, the stator 120 may have a dual winding structure in which first U-phase (201, 201'), V-phase (202, 202') and W-phase (203, 203') coils and second U-phase (211, 211'), V-phase (212, 212') and W-phase (213, 213') coils are wound around the stator 120. Specifically, the stator 120 may configure a winding pattern as shown in FIG. 2 by implementing three phases in each of the plurality of coil slots, and the first U-phase (201, 201'), V-phase (202, 202') and W-phase (203, 203') coils and the second U-phase (211, 211'), V-phase (212, 212') and W-phase (213, 213') coils may be wound in pair. In other words, there may be 12 coil slots implementing the three phases.

Specifically, among the first U-phase (201, 201'), V-phase (202, 202') and W-phase (203, 203') coils, two pairs of the first U-phase (201, 201'), V-phase (202, 202') and W-phase (203, 203') coils are wound clockwise in the order of U-phase, V-phase, and W-phase, and two pairs of the second U-phase (211, 211'), V-phase (212, 212'), and W-phase (213, 213') may be wound counterclockwise in the order of U-phase, V-phase, and W-phase.

Figure 3:
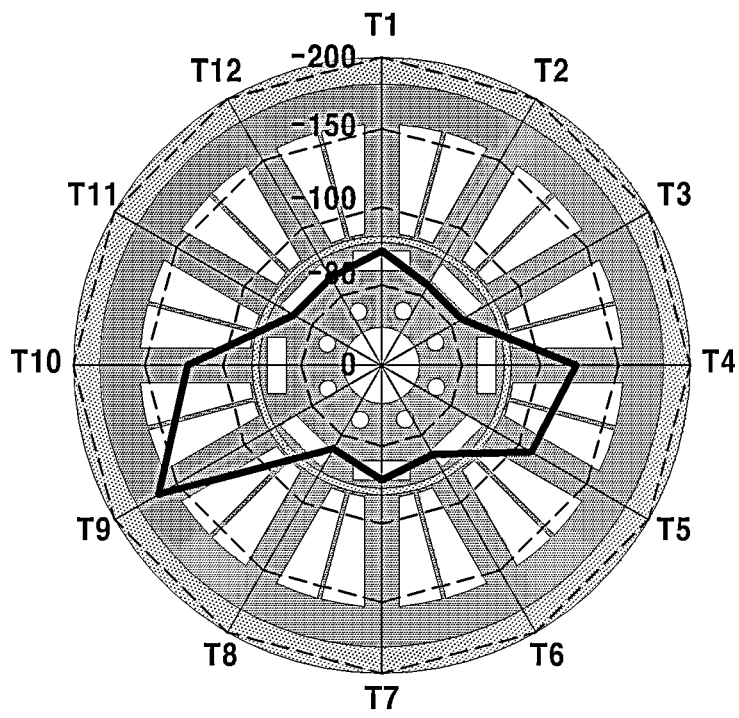
FIG. 3 is a view exemplarily illustrating the direction and strength of vibration in a steering assist device when the second U-phase, V-phase, and W-phase coils in the winding pattern of the stator of FIG. 2 according to an embodiment.

FIG. 3 is a view exemplarily illustrating the direction and strength of vibration in a steering assist device 10 when the second U-phase (211, 211'), V-phase (212, 212'), and W-phase (213, 213') coils in the winding pattern of the stator of FIG. 2 according to an embodiment.

Referring to FIGS. 3, T1 to T12 respectively may correspond to the positions of the first U-phase (201, 201'), V-phase (202, 202') and W-phase (203, 203') coils and the second U-phase (211, 211'), V-phase (212, 212'), and W-phase (213, 213') coils of FIG. 2. For example, the first W phase 203 may correspond to T11 of FIG. 3.

When the continuous first U-phase (201, 201'), V-phase (202, 202') and W-phase (203, 203') coils and continuous second U-phase (211, 211'), V-phase (212, 212'), and W-phase (213, 213') coils are wound around the stator 120 in a symmetrical structure, the connector 130 may be connected with the rack bar 410 in a direction of the middle of the angle between the center of the stator 120 and the continuous first U-phase (201, 201'), V-phase (202, 202') and W-phase (203, 203') coils. Specifically, it may be shown that in the arrangement of the three-phase coils in FIG. 2, the vibration strength and direction are shown in the direction of the continuous first U-phase (201, 201'), V-phase (202, 202') and W-phase (203, 203'), and a vibration strength similar to that of the first U-phase (201, 201'), V-phase (202, 202') and W-phase (203, 203') is shown in the symmetrical direction, i.e., the direction of the continuous second U-phase (211, 211'), V-phase (212, 212'), and W-phase (213, 213'). Accordingly, to minimize the vibration of the steering assist device, the connector 130 may be connected with the rack bar 410 in the direction of the middle of the angle between the center of the stator 120 and the continuous first U-phase (201, 201'), V-phase (202, 202') and W-phase (203, 203'). In other words, it may be the middle value of the angle between the center of the stator and T1 and T8.

The angle of connection between the steering assist device 10 and the rack bar 410 is not limited to the above-described direction of the middle of the angle between the center of the stator 120 and the continuous first U-phase (201, 201'), V-phase (202, 202') and W-phase (203, 203') but may rather be varied depending on actual measurements. As an example, as shown in FIG. 3, if the vibration is measured as largest in the direction of T9, the steering assist device 10 may be connected with the rack bar 410 in the direction corresponding to T9.

Figure 4:
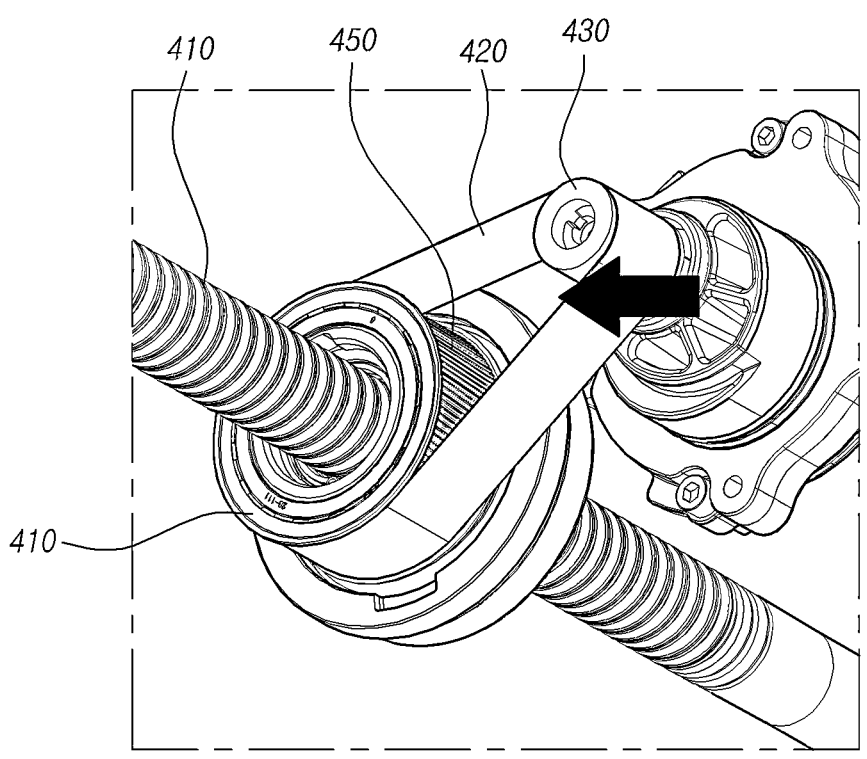
FIG. 4 is a view illustrating an example in which a connector transfers a rotational force to a rack bar through a driving belt according to an embodiment.

FIG. 4 is a view illustrating an example in which a connector 130 transfers a rotational force to a rack bar 410 through a driving belt 420 according to an embodiment.

Referring to FIG. 4, the connector 130 may include a driving belt 420 that transfers the rotational force, generated as the rotator 110 rotates, to the rack bar 410. Specifically, the connector 130 may include a motor pulley 430 and a nut pulley 450 to transfer the rotational force through the driving belt 420. The motor pulley 430 may be coupled to one side of the driving belt 420 to transfer the rotational force of the rotator 110 via the driving belt 420, and the nut pulley 450 may be mounted on the outer circumferential surface of one side of the ball nut 450 and be coupled to the other side of the driving belt 420. Here, the ball nut 450 may be coupled with the rack bar 410 via a ball and rotate to slide the rack bar 410. In other words, if current is applied to the stator 120 so that the rotator 110 is rotated by the magnetic field relationship between the coil wound around the stator and the permanent magnet of the rotator 110, and the shaft is thus rotated, the motor pulley 430 is rotated, and the nut pulley 450 connected to the driving belt 420 is rotated, and thus, the ball nut 450 coupled with the nut pulley 450 is rotated, reciprocating the rack bar 410.

The connector 130 may be connected with the rack bar 410 through the driving belt 420 so that the belt tension of the driving belt 420 faces in the direction of the vibration due to the winding pattern of the stator 120 as shown in FIG. 3. In other words, the belt tension of the driving belt 420 may be formed as indicated by the arrow of FIG. 4.

Figure 5:
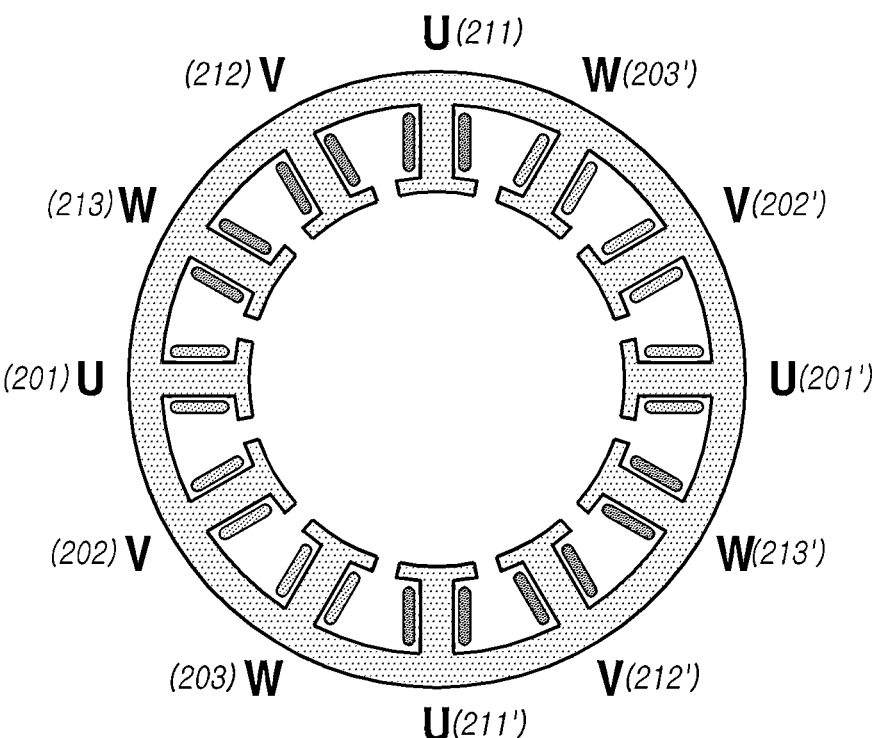
FIG. 5 is a view illustrating a winding pattern of a stator according to another embodiment.

FIG. 5 is a view illustrating a winding pattern of a stator 120 according to another embodiment.

Referring to FIG. 5, the continuous first U-phase (201, 201'), V-phase (202, 202') and W-phase (203, 203') coils and continuous second U-phase (211, 211'), V-phase (212, 212'), and W-phase (213, 213') coils are alternately wound around the stator 120 and, when the second U-phase (211, 211'), V-phase (212, 212'), and W-phase (213, 213') coils fail, the connector 130 may be connected with the rack bar 410 in the direction along which the continuous first U-phase (201, 201'), V-phase (202, 202') and W-phase (203, 203') coils are wound. Specifically, as shown in FIG. 5, the first U-phase (201), V-phase (202) and W-phase (203) coils may be wound counterclockwise in the order of the first U-phase (201'), V-phase (202) and W-phase (203) coils, the second U-phase (211), V-phase (212), and W-phase (213) coils may be wound counterclockwise in the order of the second U-phase (211), V-phase (212), and W-phase (213) coils, next to the above-described first U-phase (201'), V-phase (202) and W-phase (203) coils, the other first U-phase (201'), V-phase (202') and W-phase (203') coils may be wound in the same order as the above-described first U-phase (201), V-phase (202) and W-phase (203) coils, next to the second U-phase (211), V-phase (212), and W-phase (213) coils, and the other second U-phase (211'), V-phase (212'), and W-phase (213') coils may be wound in the same order as the above-described second U-phase (211), V-phase (212), and W-phase (213) coils, next to the second U-phase (211), V-phase (212), and W-phase (213) coils. When the winding pattern of the stator 120 is the above-described winding pattern, the connector 130 may be connected with the rack bar 410 in the direction along which the first U-phase (201), V-phase (202) and W-phase (203) coils are wound or the other first U-phase (201'), V-phase (202') and W-phase (203') coils are wound.

Figure 6:
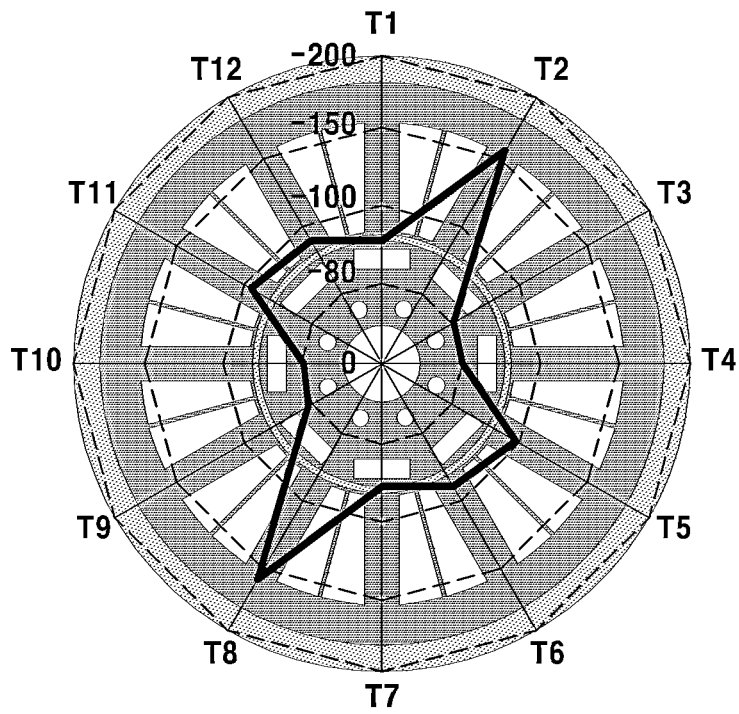
FIG. 6 is a view exemplarily illustrating the direction and strength of vibration in a steering assist device when the second U-phase, V-phase, and W-phase coils in the winding pattern of the three-phase coils of FIG. 5 according to an embodiment.

FIG. 6 is a view exemplarily illustrating the direction and strength of vibration in a steering assist device 10 when the second U-phase (211, 211'), V-phase (212, 212'), and W-phase (213, 213') coils in the winding pattern of the three-phase coils of FIG. 5 according to an embodiment.

Referring to FIG. 6, it may be shown that in the arrangement of the three-phase coils of FIG. 5, the vibration strengths and directions are shown to two opposite sides of the directions of the continuous first U-phase (201, 201'), V-phase (202, 202') and W-phase (203, 203'). Accordingly, the connector 130 may be connected with the rack bar 410 in the direction in which the first U-phase (201, 201'), V-phase (202, 202') and W-phase (203, 203') coils are wound to minimize the vibration of the steering assist device 10. The connector 130 may be connected in the direction in which any one coil among the first U-phase (201, 201'), V-phase (202, 202') and W-phase (203, 203') coils is wound and, in the case shown in FIG. 6, the connector 130 may be connected in the direction of T8. In contrast, when the first U-phase (201, 201'), V-phase (202, 202') and W-phase (203, 203') coils fail, the vibration strengths and directions will be shown to two opposite sides of the directions of the second U-phase (211, 211'), V-phase (212, 212'), and W-phase (213, 213') so that the connector 130 may be connected with the rack bar 410 in the direction in which the second U-phase (211, 211'), V-phase (212, 212'), and W-phase (213, 213') coils are wound to minimize the vibration of the steering assist device 10.

According to the foregoing description, the steering assist device 10 may change the direction of connection with the rack bar 410 depending on the winding pattern in the winding pattern of the stator 120, thereby minimizing the vibration and noise of the driven steering assist device 10 when the second U-phase (211, 211'), V-phase (212, 212'), and W-phase (213, 213') coils fail.

Figure 7:
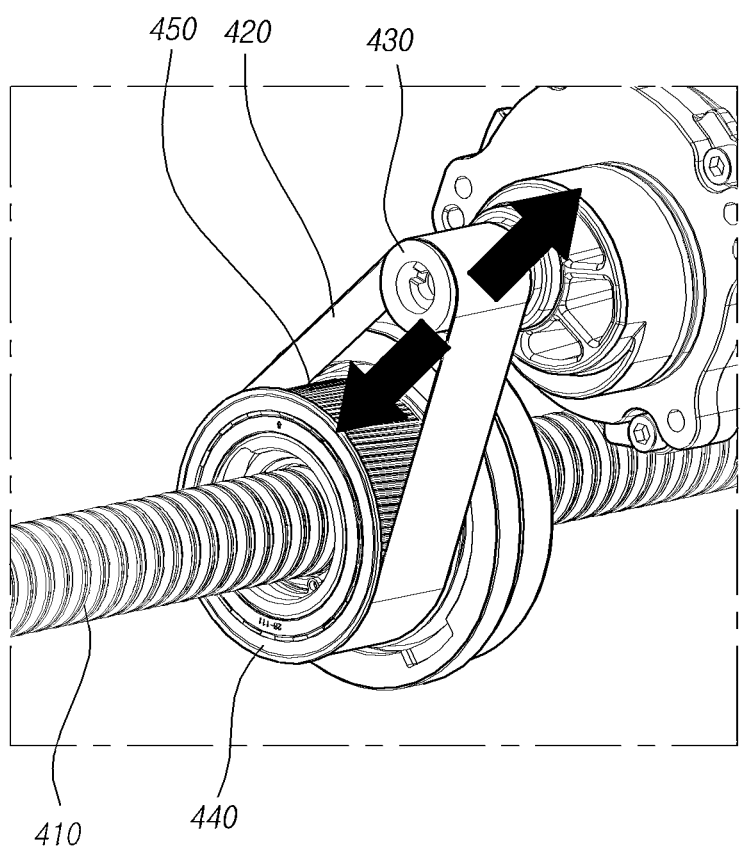
FIG. 7 is a view illustrating that a connector transfers a rotational force to a rack bar through a driving belt according to another embodiment.

FIG. 7 is a view illustrating an example in which a connector 130 transfers a rotational force to a rack bar 410 through a driving belt 420 according to another embodiment.

Referring to FIG. 7, the connector 130 may transfer the rotational force to the rack bar 410 through the driving belt 420 to minimize the vibration direction and strength of the steering assist device 10 shown in FIG. 6. The connector 130 may be connected so that the belt tension of the driving belt 420 is formed in the direction of the vibration due to the winding pattern of the stator 120 as shown in FIG. 6. When there are two or more vibration directions as shown in FIG. 6, the connector 130 may be connected in any one of the two directions. In other words, the connector 130 may be connected with the rack bar 410 in any one direction of T2 or T8.

The connector 130 may transfer the rotational force of the rotator 110 to the rack bar 410 using a reducer including a worm shaft and a worm wheel. Specifically, the connector 130 may be connected with the reducer in the direction of minimizing the vibration and noise of the steering assist device 10 depending on the winding pattern, and the reducer may reciprocate the rack bar 410 through the pinion gear by the rotational force received from the connector 130.

Figure 8A:
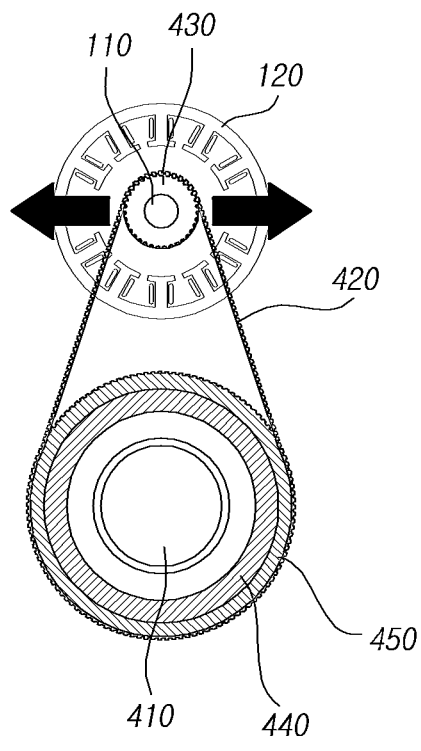
FIGS. 8A and 8B are views illustrating that a connector is connected in a direction in which vibration is generated to reduce the vibration according to an embodiment.
Figure 8B:
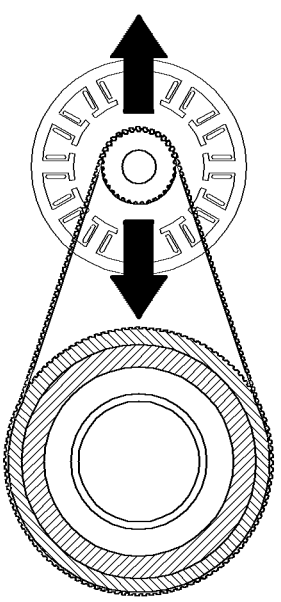

FIGS. 8A and 8B are views illustrating that a connector 130 is connected in a direction in which vibration is generated to reduce the vibration according to an embodiment.

Referring to FIG. 8A, in a case where the stator 120 of FIG. 8A has a coil arrangement as shown in FIG. 2, and the second U-phase (211, 211'), V-phase (212, 212'), and W-phase (213, 213') coils fail, if the rotator is rotated by the current applied only to the first U-phase (201, 201'), V-phase (202, 202') and W-phase (203, 203') coils, vibration may be generated in the left and right directions as shown in FIG. 8A (e.g., the T9 and T4 directions of FIG. 3). Therefore, to reduce the vibration of the steering assist device 10, referring to FIG. 8B, the connector 130 may be connected with the stator 120 in the direction in which vibration is generated, by changing the angle at which the stator 120 is disposed. The vibration of the steering assist device 10 may be reduced by holding the steering assist device 10, which vibrates in the upper and lower directions, with the belt tension, which is formed towards the rack bar 410 (lower direction) by the driving belt 420. In other words, as the stator 120 rotates counterclockwise so that the direction of vibration becomes the upper/lower direction, the vibration of the steering assist device 10 may be reduced.

Figure 9A:
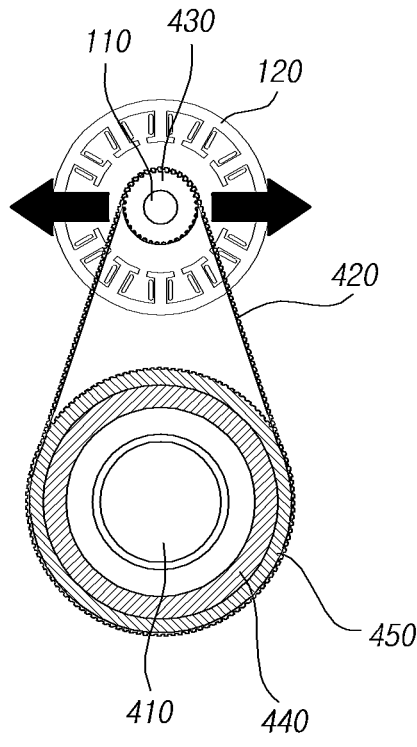
FIGS. 9A and 9B are views illustrating that a connector is connected in a direction in which vibration is generated to reduce the vibration according to another embodiment.
Figure 9B:
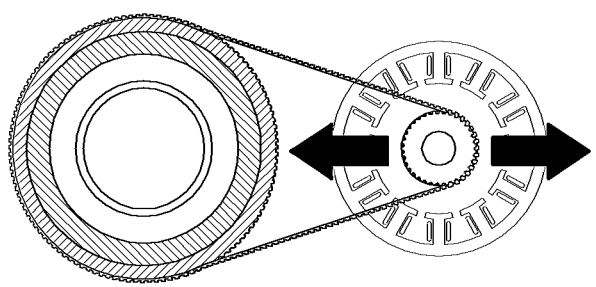

FIGS. 9A and 9B are views illustrating that a connector 130 is connected in a direction in which vibration is generated to reduce the vibration according to another embodiment.

Referring to FIG. 9, in FIG. 9A, when the second U-phase (211, 211'), V-phase (212, 212'), and W-phase (213, 213') coils fail depending on the winding pattern as shown in FIG. 8A, vibration may be generated in the left/right direction. Accordingly, to reduce the vibration of the steering assist device 10, the connector 130 may be connected with the stator disposed so that the direction of vibration of the stator 120 faces the rack bar, as shown in FIG. 9A. The position of the stator 120 is shifted from the upper surface to side surface of the rack bar 410, so that the rack bar 410 is positioned in the direction of vibration of the steering assist device 10 and, as the steering assist device 10 is connected with the rack bar 410 through the driving belt 420, the vibration of the steering assist device 10 in the left/right direction may be reduced.

In the disclosure, a change in the position of connection of the steering assist device 10 may be defined as a change in the connector 130.

Figure 10:
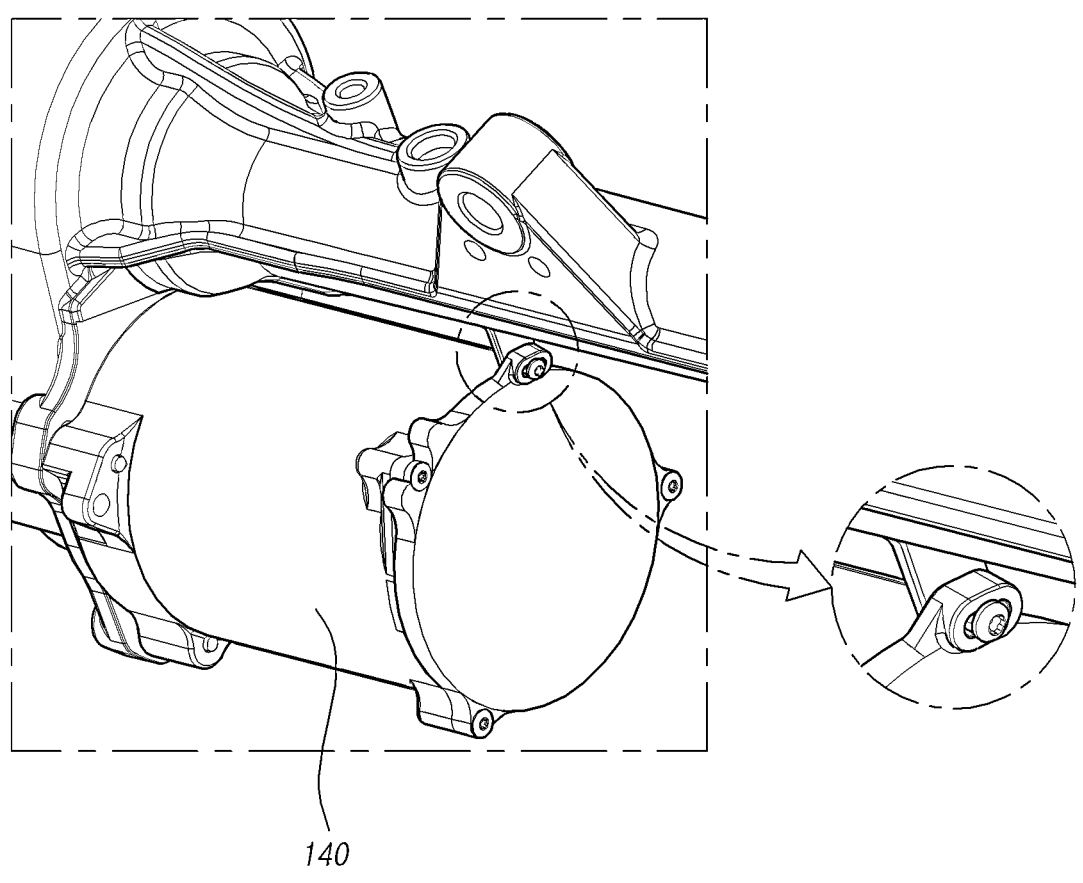
FIG. 10 is a view exemplarily illustrating that a housing is fixed with a rack bar according to an embodiment.

FIG. 10 is a view exemplarily illustrating that a housing 140 is fixed with a rack bar 410 according to an embodiment.

Referring to FIG. 10, the connector 130 may be connected with the rack bar 410 so that one surface of the housing 140 facing the rack bar 410 is spaced apart. Specifically, the connector 130 may be connected with the rack bar 410 in the direction of minimizing the vibration and noise of the steering assist device 10 depending on the winding pattern of the stator 120. To further reduce vibration and noise, the connector 130 may be connected while being spaced apart from the rack bar 410 by a predetermined interval. Further, the housing 140 may be coupled by a bolting structure so that one surface of the housing 140 facing the rack bar 410 is fixed, thereby further reducing the vibration and noise of the steering assist device 10. Further, the housing 140 may be coupled by a bolting structure so that one surface of the housing 140 facing the rack housing surrounding the rack bar 410 is fixed to the rack housing.

As described above, according to the disclosure, the steering assist device 10 may change the direction of connection with the rack bar 410 depending on the winding pattern of the stator 120, thereby minimizing the vibration and noise of the steering assist device 10 when the coil of the stator 120 fails.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATIONS

This application claims priority to Korean Patent Application No. 10-2020-0045489 filed in the Korean Intellectual Property Office on Apr. 14, 2020, the disclosure of which is incorporated by reference herein in its entirety.

The invention claimed is:

1. A steering assist device, comprising:
   a stator around which a plurality of coils are wound in a winding pattern;
   a rotator that is rotated by the stator; and
   a connector that transfers a rotational force generated as the rotator rotates to a rack bar and that is connected to the rack bar in a direction that causes the connector to minimize vibrations of the steering assist device that are generated when at least one of the plurality of coils that are wound around the stator fails.

2. The steering assist device of claim 1, wherein the stator comprises a dual winding structure, the dual winding structure comprises first U-phase, V-phase, and W-phase coils and second U-phase, V-phase, and W-phase coils that are wound around the stator in the winding pattern.

3. The steering assist device of claim 1,
   wherein the steering assist device further comprises a housing that houses the stator and the rotator, and
   wherein the connector is connected with the rack bar so that one surface of the housing, facing the rack bar, is spaced apart from the rack bar.

4. The steering assist device of claim 3, wherein the housing is coupled by a bolting structure that fixes the one surface of the housing facing the rack bar in place with respect to the rack bar.

5. The steering assist device of claim 1, wherein the connector comprises a driving belt that transfers a rotational force to the rack bar, and wherein the driving belt is wrapped around the rack bar to form a belt tension in a direction of maximizing the vibration.

6. A steering assist device, comprising:

a stator around which a plurality of coils are wound in a winding pattern;

a rotator that is rotated by the stator; and a connector that transfers a rotational force generated as the rotator rotates to a rack bar and that is connected to the rack bar in a direction that minimizes vibration generated by the stator when at least one of the plurality of coils that are wound around the stator fails, wherein the stator comprises a dual winding structure, the dual winding structure comprises first U-phase, V-phase, and W-phase coils and second U-phase, V-phase, and W-phase coils that are wound around the stator in the winding pattern, and wherein when the continuous first U-phase, V-phase, and W-phase coils and the continuous second U-phase, V-phase, and W-phase coils are wound around the stator in a symmetrical structure, the connector is connected with the rack bar in a direction of a middle of an angle between a center of the stator and any one of the continuous first U-phase, V-phase, and W-phase coils.

7. A steering assist device, comprising:

a stator around which a plurality of coils are wound in a winding pattern;

a rotator that is rotated by the stator; and a connector that transfers a rotational force generated as the rotator rotates to a rack bar and that is connected to the rack bar in a direction that minimizes vibration generated by the stator when at least one of the plurality of coils that are wound around the stator fails, wherein the stator comprises a dual winding structure, the dual winding structure comprises first U-phase, V-phase, and W-phase coils and second U-phase, V-phase, and W-phase coils that are wound around the stator in the winding pattern, and wherein when the continuous first U-phase, V-phase, and W-phase coils and the continuous second U-phase, V-phase, and W-phase coils are alternately wound around the stator, and the continuous second U-phase, V-phase, and W-phase coils are broken, the connector is connected with the rack bar in a direction along which the continuous first U-phase, V-phase, and W-phase coils are wound.

* * * * *